ALEXANDER FISHER. RING DRIVER.

116290

PATENTED JUN 27 1871

Witnesses
Dr Drowne
Geo. Greene

Inventor.
Alex'r Fisher,
by his Attorney
James G. Arnold

UNITED STATES PATENT OFFICE.

ALEXANDER FISHER, OF WHITINSVILLE, MASSACHUSETTS.

IMPROVEMENT IN RING-DRIVERS.

Specification forming part of Letters Patent No. 116,290, dated June 27, 1871.

*To all whom it may concern:*

Be it known that I, ALEXANDER FISHER, of Whitinsville, in the county of Worcester and State of Massachusetts, have invented a new and useful Machine called a Ring-Driver, of which the following is a specification:

My invention is for the purpose of centering a ring with respect to the end of a wooden roller, and forcing such ring into such end.

Figure 1:
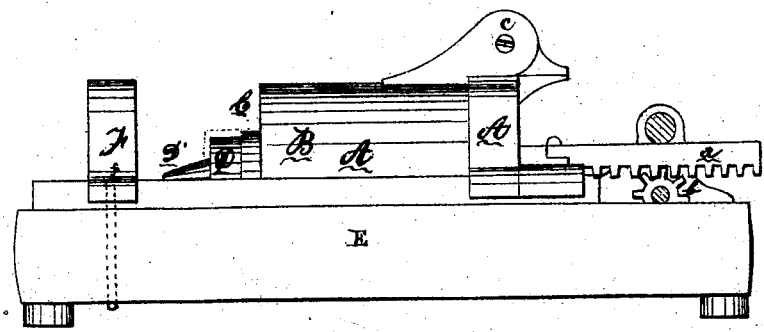
Figure 2:
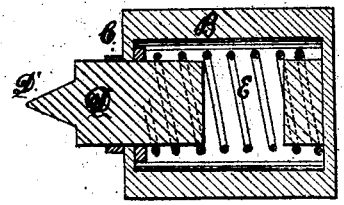

Of the drawing, Figure 1 is a side elevation of my said invention or machine for such purpose, Fig. 2 being a section taken through and in line of the axis of the driving-head, the ring-carrier, and centering device.

In Fig. 1 of such drawing A denotes a slider, supported on a frame, E, and provided with a toothed rack, $a$, there being a gear or pinion, $b$, to play on and give motion to such rack. The said pinion is fixed on a horizontal shaft supported in bearings applied to the frame E, and such shaft may or is to be provided with suitable means for revolving it. B is the driver, which is a suitably-shaped hollow box, hinged, as shown at $c$, to the slide A. Arranged within the front part of the driver B is the ring-carrier D, provided with a centering-cone, D′, arranged so as to project from it, as shown, and to be concentric with the carrier D, which is cylindrical, and applied to the driver B so as to be capable of being slid longitudinally therein. A helical spring, E, arranged within the driver in manner as shown in Fig. 2, is so applied to the carrier as to admit of its being pressed backward within the driver, the spring operating to advance the carrier to its normal position, or until a shoulder in the carrier may bring up against the front end of the chamber in the driver. A tubular projection, C, surrounds the carrier D, and projects from the driver B, as shown in Figs. 1 and 2. There is an abutment or roller-supporter, F, which is provided with a hole, $f$, or other proper means of receiving and supporting the roller at that end of it which may be opposite to the one to have a ring forced into it by the machine. The said abutment or roller-supporter may be movable on the frame E, and provided with means of fastening it to such frame, as occasion may require.

In operating with the machine the ring to be forced into the end of a roller or pivot is to be placed on the carrier in advance of and against the projection C. The roller is next to be applied to the abutment or supporter F with one end against the same, and with the axis of the roller arranged in line of that of the driver, the roller being suffered to have a round hole bored axially in it at the end of it next to the carrier D. Next, the slide A, with the driver B and carrier D and projection C, is to be advanced by the rack and pinion so as to cause the cone D′ to enter the hole in the end of the roller and center the roller with respect to the driver and the tubular projection C thereof. The driver B continuing to advance, the part C will force the ring into the end of the roller concentric with the hole thereof, the part D being stationary while the driver B may be advancing to effect the forcing of the ring into the wood.

The operations of the parts in other respects will be readily understood.

I claim—

The ring-driver B, (pivoted at $c$ to the slide A, and operated by such and the rack and pinion $a$ and $b$,) the tubular projection C, ring-carrier D, and centering-cone D′, arranged together and with the bed-frame E and the roller-supporter F, all being constructed substantially in the manner and for the purpose as described.

ALEXANDER FISHER.

Witnesses:
   A. V. DROWNE,
   JAS. G. ARNOLD.